United States Patent [19]

Russell

[11] Patent Number: 4,610,785

[45] Date of Patent: Sep. 9, 1986

[54] SLUDGE SEPARATION APPARATUS

[75] Inventor: Frederick E. Russell, Elgin, Ill.

[73] Assignee: Protectaire Systems Co., Elgin, Ill.

[21] Appl. No.: 688,571

[22] Filed: Jan. 3, 1985

[51] Int. Cl.⁴ .................. B01D 21/04; B01D 47/02; B05C 15/00

[52] U.S. Cl. .................. 210/195.1; 55/228; 210/196; 210/221.1; 210/257.1; 210/258; 210/527

[58] Field of Search .............. 55/228, 229, DIG. 46; 98/115 SB; 210/167, 195.1, 196, 202, 221.1, 221.2, 257.1, 258, 262, 523, 525, 527

[56] References Cited

U.S. PATENT DOCUMENTS

| | | | |
|---|---|---|---|
| 1,314,955 | 9/1919 | Flicker | 210/221.1 X |
| 2,135,442 | 11/1938 | Steindorf et al. | 210/525 |
| 2,159,409 | 5/1939 | Tark | 210/527 |
| 2,195,344 | 8/1937 | Slaugenhop | 210/527 X |
| 2,805,844 | 9/1957 | McMaster | 210/167 X |
| 2,813,074 | 11/1957 | Banks et al. | 210/525 X |
| 3,179,252 | 4/1965 | Vrablik | 210/221.1 X |
| 3,286,844 | 11/1966 | Juell | 210/221.2 X |
| 3,396,102 | 7/1967 | Forrest | 210/527 X |
| 3,410,412 | 11/1968 | Fechter | 210/527 X |
| 3,516,230 | 6/1970 | Saubesty | 98/115 SB X |
| 3,627,135 | 12/1971 | Goodman | 210/221.1 X |
| 3,679,056 | 7/1972 | Haymore | 210/221.2 |
| 3,749,246 | 7/1973 | Hargraves | 210/221.1 X |
| 3,847,802 | 11/1974 | Lemke | 210/527 |
| 4,100,066 | 7/1978 | Bloomer et al. | 210/221.1 X |
| 4,102,303 | 7/1978 | Cordier et al. | 98/115 SB X |
| 4,257,891 | 3/1981 | Albohn | 210/523 X |
| 4,432,870 | 2/1984 | Russell | 210/143 |
| 4,472,181 | 9/1984 | Herrlander | 210/195.1 X |
| 4,490,259 | 12/1984 | Coffing | 210/221.2 X |

FOREIGN PATENT DOCUMENTS 28877 9/1970 Japan .................. 210/527
82/3800 11/1982 PCT Int'l Appl. .............. 210/221.1

OTHER PUBLICATIONS

"Ultrafilt Suspended Sludge Separator", Water Technology, Inc. 1979.

Primary Examiner—Robert Spitzer
Attorney, Agent, or Firm—Fitch, Even, Tabin & Flannery

[57] ABSTRACT

A sludge-separating apparatus including a separation tank for receiving a supply of liquid and sludge from an adjacent holding tank. A pump having an outlet disposed at the bottom of the separation tank transports suspended sludge from the adjacent holding tank to the separation tank. A baffle plate disposed in the separation tank adjacent the outlet deflects the suspended sludge entering therethrough toward the surface of the liquid held in the separation tank. A divider in the separation tank allows relatively sludge-free liquid to pass into one of the regions defined by the divider. A liquid return returns the sludge-free liquid to the holding tank. An automatic skimmer is associated with the sludge-containing region of the separation tank for skimming floating sludge and discharging the sludge over an upwardly inclined end panel. A drive means for reciprocating the skimmer allows both reciprocating motion of the skimmer and tilting and pivoting action of the skimmer as it travels upwardly and downwardly along the inclined end panel.

11 Claims, 12 Drawing Figures

Fig. 2

SLUDGE SEPARATION APPARATUS

BACKGROUND OF THE INVENTION

The present invention relates to an apparatus separating sludge from a liquid and may be advantageously used in conjunction with a spray booth wherein water is used to remove oversprayed particles from the air.

The spraying of coatings such as paints, enamels, lacquers, etc. is commonly conducted in booths in which a flow of air transports oversprayed particles and volatile organic solvents away from the worker. An efficient method of removing oversprayed particles from the air within such a booth is to provide water washes in the path of the coating spray and/or air flow, the water washes trapping the airborne particles. A spray booth of this type is disclosed in U.S. Pat. No. 4,484,513, issued on Nov. 27, 1984, which is herein incorporated by reference. In such spray booths, the trapped paint particles travel with the water to a holding tank from which the water is recirculated to the water washes. Most holding tanks have chemicals added to the water therein for agglomerating the paint spray particles, and many of the agglomerated particles form a floating piece of sludge.

While water wash spray booths have effectively cleaned the air that is exhausted from the spray booth, the problem remains of how to dispose of both the agglomerated spray particles cleaned from the air and the water used to clean the air. For example, when solvent-based coatings are used in the spray booth, significant amounts of hydrocarbons may be released into the air, not only during initial spraying, but also as they evaporate from the agglomerated oversprayed particles floating in the water in the holding tank. Further, discharge of the water utilized in the spraying booth presents a substantial waste disposal problem. Due to the solvents, paint particles and the paint agglomerating chemicals contained therein, the water may not be directly discharged into sewage systems. Because of problems associated with disposal of the water, it is desirable to use the water for as long as possible before replacing it. However, concomitant with the use of the water is the need to prevent the formation of septic conditions therein. Although certain chemicals may be used to prevent septic conditions in the water, such chemicals add further to the pollution problem entailed in the eventual discharge of the water.

Because the sludge contains, in part, recoverable pigments, it may, in some instances, if collected, be recycled by chemical companies. Often the maintenance of the spray booth had involved the periodic skimming of sludge from the tank and the dispatching of a crew to drain and manually scrape sludge from the bottom of the holding tank.

A sludge separation device that addresses the concerns discussed above is disclosed in U.S. Pat. No. 4,432,870, issued Feb. 21, 1984, and herein incorporated by reference. The device of the patent employs a separate sludge removal tank from which floating sludge is transferred to a collection bin by means of a reciprocating skimmer. The present invention constitutes an improvement over the above-referenced sludge separation device in that the water levels of the holding tank and the separation tank are no longer required to be substantially the same in order for liquid and sludge to be transferred therebetween, thereby making the retrofitting of existing spray booths with the inventive separation device not dependent on the elevation of the holding tank of the spray booth. Collaterally, the inventive separation device removes the requirement that the water levels in the respective tanks be precisely controlled in order for sludge and liquid to be transported from the holding tank to the separation tank and for clarified liquid to be returned from the separation tank to the holding tank. Additionally, the drive system for reciprocating the skimmer that forms a part of the separation device is improved so as to be subjected to fewer stresses during the course of operation and less likely to come in contact with contaminating and corroding sludge and water during the course of operation.

SUMMARY OF THE INVENTION

These advantages are obtained by a sludge separating apparatus that includes a separation tank for receiving a supply of liquid and sludge from an adjacent holding tank. Pump means is utilized for transporting suspended sludge from the adjacent holding tank to the separation tank, with the pump means having an inlet in the holding tank and an outlet in the separation tank. In order to prevent sludge particles from settling on the bottom of the separation tank and to circulate such particles upwardly toward the surface of the liquid, the outlet from the pump is disposed at the bottom of the separation tank, and a baffle plate is disposed in the separation tank adjacent the outlet for directing the suspended sludge entering through the outlet toward the surface of the liquid held in the separation tank. Dividing means, such as a plate, isolates the separation tank into two regions, the outlet of the pump means being in the first region. The dividing means allows relatively sludge-free or clarified liquid to pass into the second region, and liquid return means associated therewith returns the clarified liquid to the holding tank. An automatic skimmer including a carriage that has a pusher plate mounted thereon is associated with the first region of the separation tank. The pusher plate of the skimmer engages sludge floating on the surface of the liquid and drives the sludge over an upstanding wall bounding the first region of the separation tank into a collection drum or the like. The drive means for reciprocating the skimmer includes an endless chain entrained about two gears, one of the gears being rotated by a motor to rotate the chain. An actuator attached to the chain is captured within a channel secured to the carriage, the channel being oriented perpendicular to the direction of skimmer travel.

BRIEF DESCRIPTION OF THE DRAWINGS

FIG. 1 is an elevational view of a spray booth and an attached sludge separation device embodying the various features of the invention;

Figure 2:
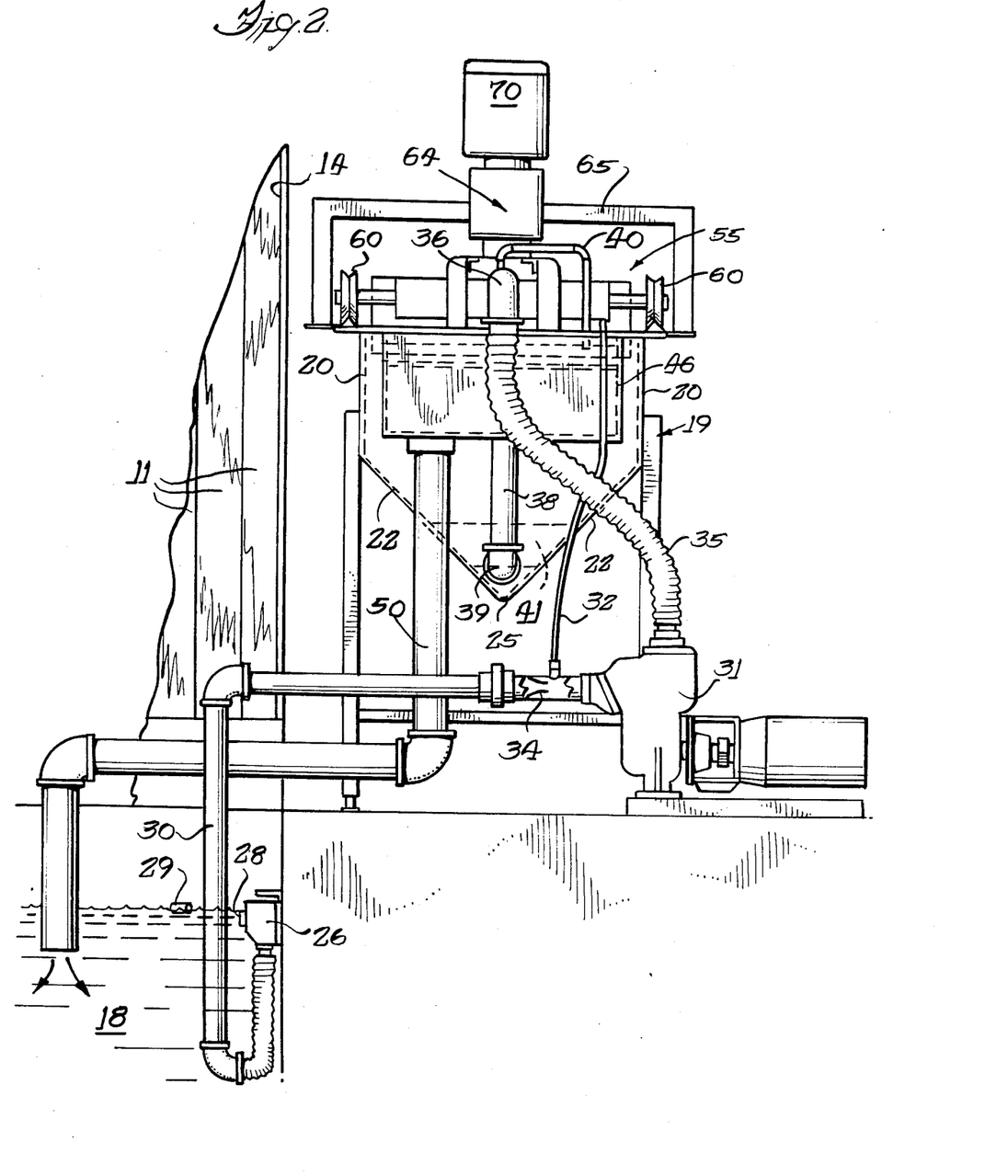
FIG. 2 is an enlarged elevational view in partial cross-section of the sludge separation device shown in FIG. 1.
Figure 3:
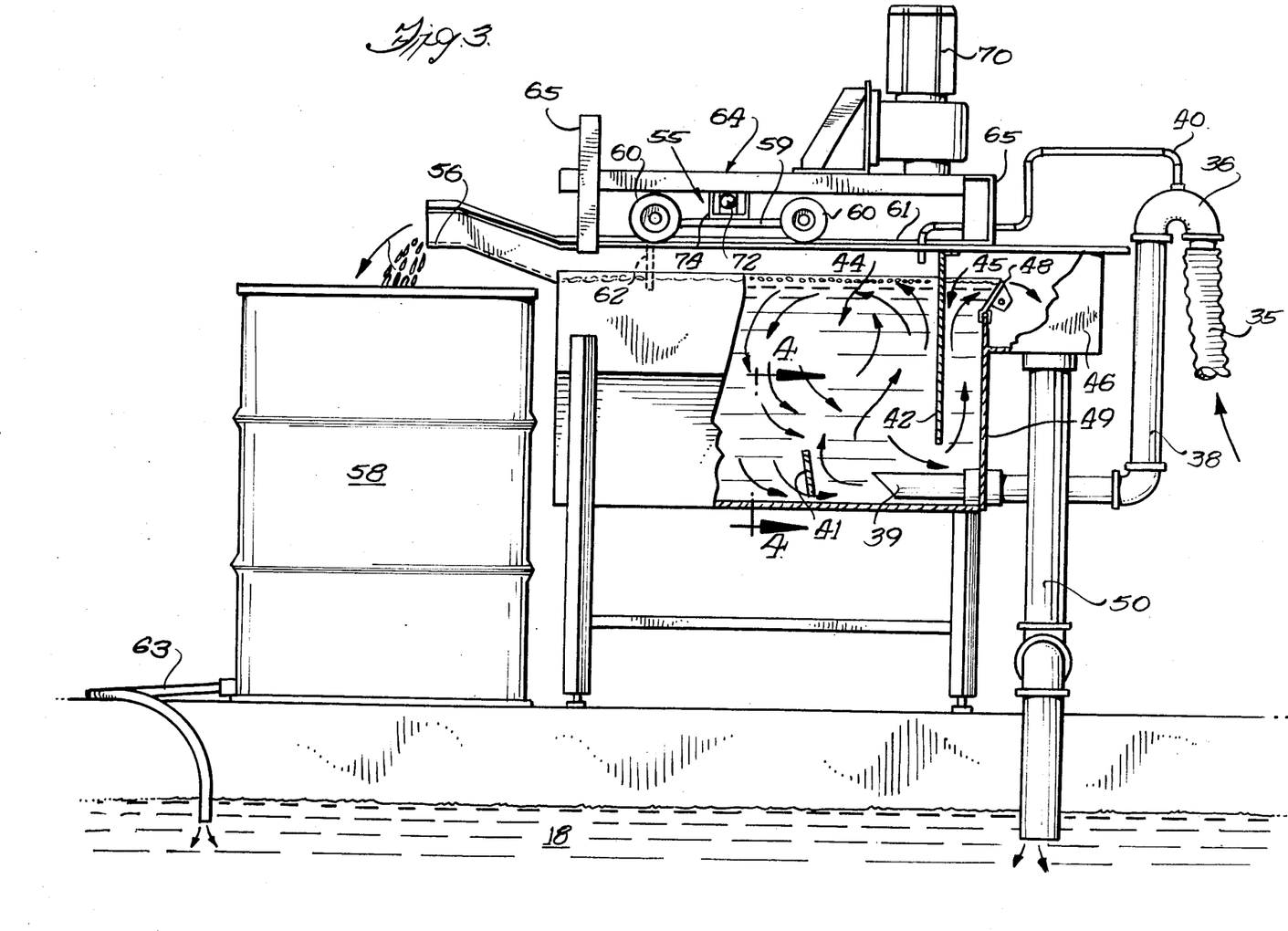
FIG. 3 is a side elevational view in partial cross-section of the sludge separation device shown in FIG. 2.
Figures 4, 7, 8:
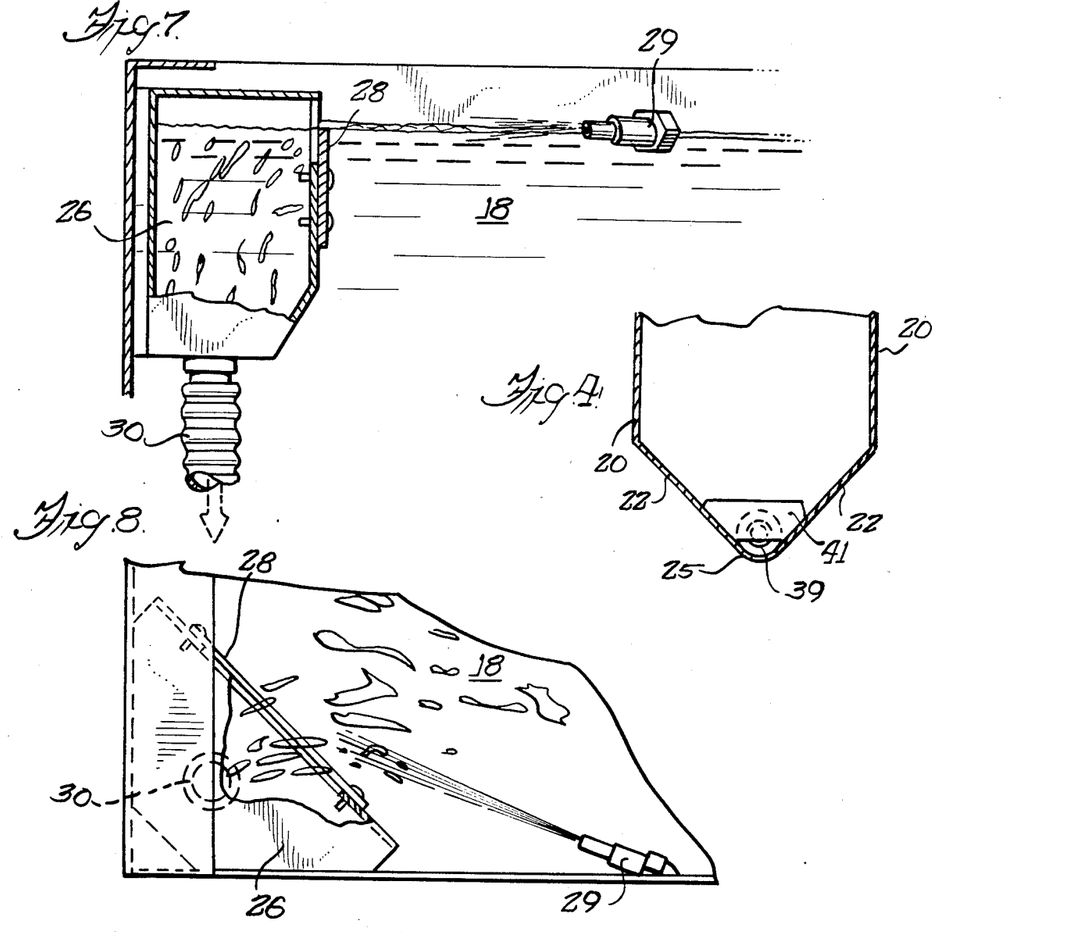
FIG. 4 is a fragmentary cross-sectional view of the sludge separation tank taken substantially along line 4—4 in FIG. 3.

In accordance with the invention, a baffle plate 41, best seen in FIGS. 3 and 4, is disposed in the narrowed bottom 25 of the separation tank 19 adjacent to the outlet 39 through which sludge-laden water is discharged into the separation tank 19. In practice, the baffle plate 41 is approximately five inches in height and spaced from the bottom of the tank 19 by approximately one inch. To direct the incoming sludge toward the surface of the water in the separation tank 19, the baffle plate 41 is inclined away from the outlet 39 at an angle of from approximately 3° to 5° from vertical. Additionally, the outlet 39 is angled at approximately 45° to diffuse the sludge-laden water as it is discharged into the separation tank 19.

A second baffle plate or divider 42 extends between the two opposite sides 20 of the upper portion of the separation tank 19 "upstream" of the outlet 39 for the sludge-laden water so as to divide the separation tank into two parts, 44, 45. The upper edge of the baffle extends above the surface of the water in the separation tank 19, while the bottom of the baffle 42 is spaced from the bottom of the tank 19 so that water may flow underneath. As shown by the directional arrows in FIG. 3, the sludge-laden water is discharged through the pipe outlet 39 hits the baffle 41 and is deflected upwardly to create a circular rotational flow on the left side of the baffle plate 42 to float the sludge to the top of the tank without settling of the sludge. Accordingly, as the baffle plate 41 deflects incoming sludge away from the bottom of the separation tank and toward the surface of the water held therein, floating sludge will remain in the first region 44 of the separation tank, as defined by the baffle plate 42, while clarified water relatively free from floating and suspended sludge flows from the left side of the separation tank and drops and flows under the baffle 41 into the second region 45.

Figure 5:
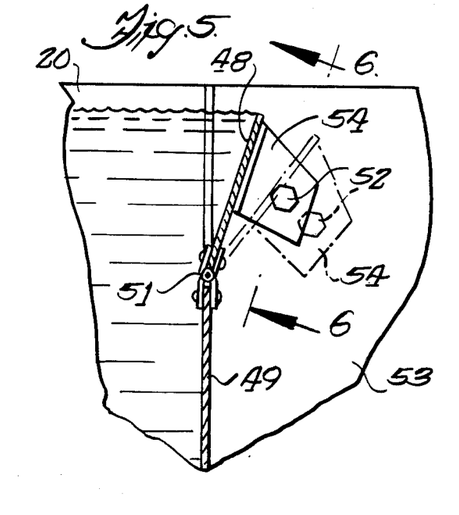
FIG. 5 is an enlarged fragmentary view of a portion of the liquid return means associated with the sludge separation tank.
Figure 6:
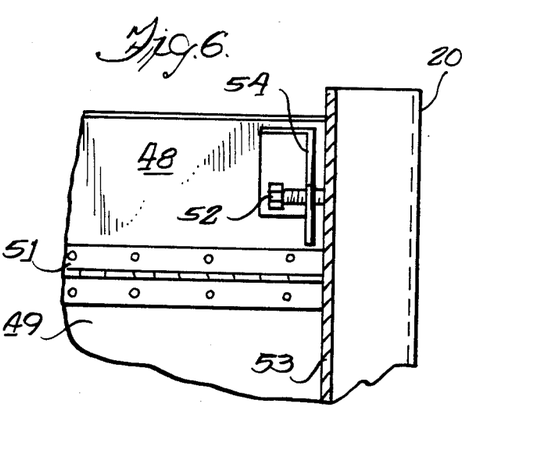
FIG. 6 is a view of a portion of the liquid return means taken substantially along line 6—6 in FIG. 5.

Contiguous with the second or sludge-free region 45 is a reservoir 46 into which the clarified water flows over a weir 48 (FIGS. 3-6) integral with the end panel 49 of the separation tank 19. The clarified water is then returned by gravity to the holding tank 18 through a pipe 50. In accordance with the invention, the height of the upper edge of the weir 48 is adjustable so as to regulate the water level in the separation tank 19. To this end, the weir 48 is pivotally attached to the end panel 49 by means of, for example, a hinge 51 (FIG. 5) coextensive with the weir and the upper edge of the end panel 49. Once the desired height of the edge is achieved by pivoting the weir 48 about the hinge 51, the position of the weir is maintained by two friction pads 52 (FIGS. 5-6) in the form of nylon bolts that engage opposite sides 53 of the return reservoir 46. The nylon bolts are disposed at opposite ends of the weir 48 and are secured thereto by means of ears 54 integral with the weir. The nylon bolts are received in threaded holes in the ears 54 and may be screwed to exert sufficient force against the sidewalls 53 of the reservoir 46 to maintain the position of the weir 48.

Briefly summarizing the operation of the system to this point, a major portion of the overspray particles are trapped by the water cascading down the baffle panels 11 and is dumped into the holding tank 18. The particles and water are then transported to the sludge separation tank 19 where the particles are floated to the surface of the first region 44 of the separation tank, while clarified water is returned from the second region 45 to the holding tank 18, whereupon the water is recirculated to the baffle panels 11. In keeping with the invention, the agglomerated particles forming the sludge floating in the first region 44 of the separation tank 19 are removed by a skimmer, generally indicated by 55, that is periodically reciprocated to shove the sludge up an upstanding wall or inclined panel 56 extending outwardly from the sludge separation tank 19 and over the edge of the panel 56 into a sludge collection container or drum 58 Preferably, the collection drum includes a hose 63 leading from the bottom of the drum 58 to the holding tank to form a supernatent drain, and in practice, the drum 58 is lined with a disposable liner (not shown). After the collection drum 58 is filled, it is sealed to prevent further release of hydrocarbons and forwarded to a chemical company for recovery of pigments or is forwarded to a chemical disposal company.

Figures 10, 11, 12:
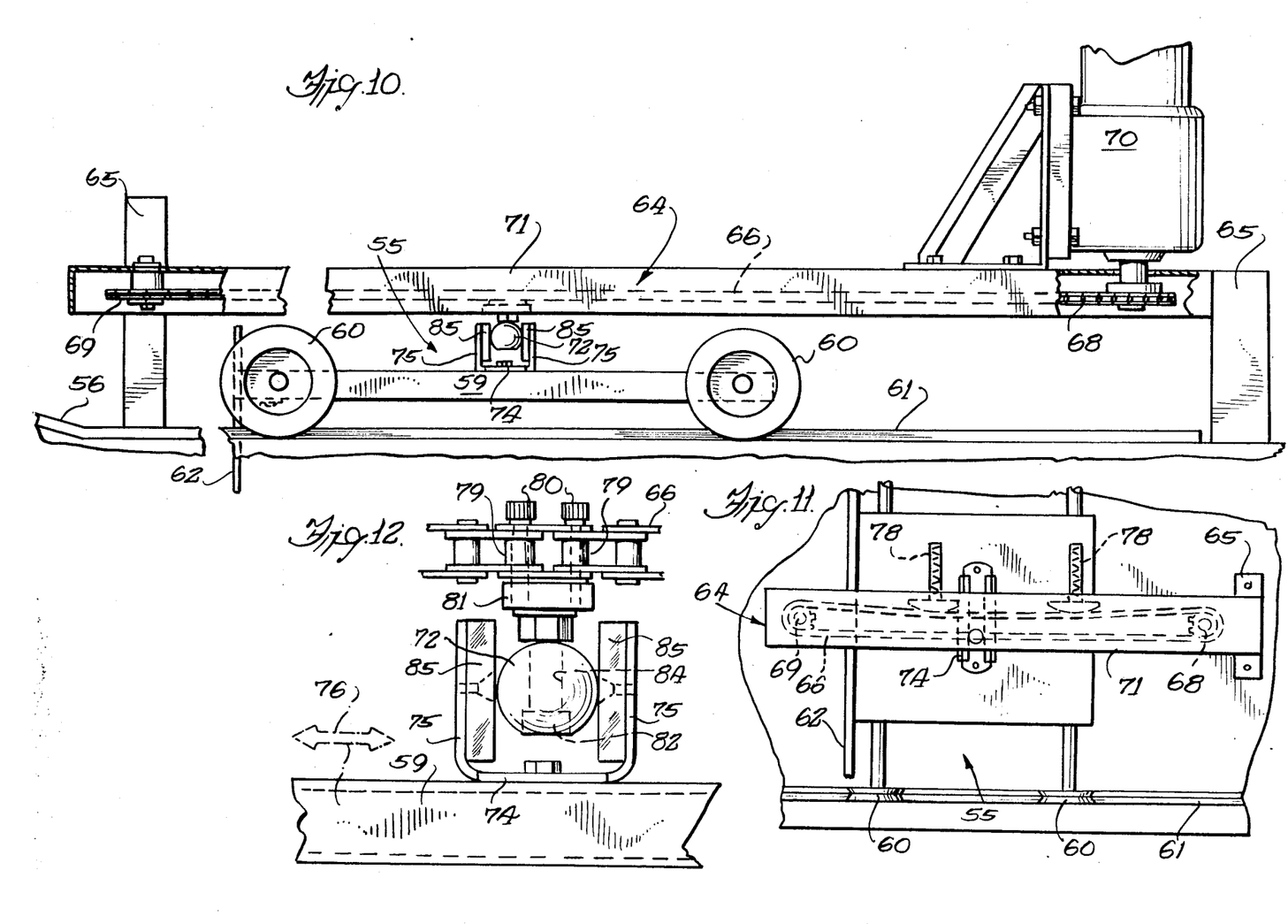

Returning to the drawings, the skimmer 55 includes a carriage 59 that straddles the separation tank 19 and rolls on four wheels 60 over parallel tracks 61 running along the sides of the tank 19 and upwardly along the inclined panel 56. The sludge is skimmed from the surface of the water by a pusher plate 62 which has a transverse dimension generally equal to the distance between the vertical sidewalls 20 of the separation tank 19. The pusher plate 62 may be mounted to the carriage 59 as described in U.S. Pat. No. 4,432,870, so as to pivot between a vertical skimming position (when the carriage 59 travels from right to left as seen in FIGS. 3 and 10) and a tilted return position (when the carriage 59 travels from left to right) in which the pusher plate is entirely out of the water. When in its vertical skimming position, the pusher plate 62 extends below the surface of the water in the separation tank 19 so as to engage the floating sludge. The drive of the skimmer has proven to be difficult in that not only must the drive reciprocate the skimmer rectilinearly but also the drive must accommodate the tilting of the skimmer as it pushes sludge over the end of the tank.

In accordance with the invention, a drive system is provided for periodically reciprocating the carriage back and forth over the separation tank 19 and to allow upward pivoting of the skimmer without binding. Referring to FIGS. 9-12, the drive system, generally indicated by 64, overlies the separation tank 19 and is supported by upstanding brackets 65 secured on opposite ends of the separation tank 19. The drive system 64 includes an endless roller chain 66 trained about two sprockets or gears 68, 69, gear 68 being driven by a motor 70, while gear 69 is a free-wheeling or idler gear. A protective guard 71 encloses the chain 66 and gears 68, 69 to prevent unintentional contact therewith by personnel during the operation of the drive system and to protect the system from dirt and grime. In order to reciprocate the carriage 59, the chain 66 carries an actuator ball 72 that is captured in a ball track or channel 74 secured to the carriage 59, the groove and sidewalls 75 of the ball track 74 being oriented perpendicular to the direction of reciprocation of the carriage 59, as indicated by the arrow 76 in FIG. 12. Accordingly, the actuator ball 72, when moving with the traveling chain 66 between the two gears or sprockets 68, 69, will engage one of the sidewalls 75 of the ball track 74 to push the carriage toward one or the other ends of the separation tank 19. Upon engagement of the portion of the chain 66 supporting the actuator ball 72 with either gear 68, 69, thus changing the direction of travel of the actuator ball 72, the actuator 72 will slide in the ball track 74 toward the opposite end thereof and, upon rotation about the gear, will engage the opposite ball track sidewall 75 to push the carriage in the opposite direction. The spherical surface of the ball 72 allows the forward sidewall of the ball track to slide upwardly therealong with the rearward sidewall moving downwardly along the ball as skimmer carriage moves up the inclined panel 56. In order to prevent the chain 66 from slipping about the gears 68, 69 during operation, two spring-loaded plunger-type tensioners 78 (FIG. 11) are provided to tighten the chain 66 about the gears 68, 69.

Describing the actuator ball and ball track in greater detail, in order to secure the actuator ball 72 to the chain 66, at least two pins 79 of the roller chain 66 are hollow so as to receive screws 80 that secure a carrier block 81 to the chain 66. (See FIG. 12.) The actuator ball 72 is secured to the carrier block 81 by a bolt 82 received in a bore 84 coincident with the diameter of the actuator ball 72. In order to reduce wear on the walls 75 of the ball track and to lessen the friction between the walls and the actuator ball 72, abrasion-resistent pads 85, preferably made of ultra-high molecular weight polyethylene, are secured to the walls of the ball track 74. As can be appreciated, motion of the actuator ball 72 in the track 74 is restricted only by the sidewalls 75 of the track, the actuator ball being free to move up or down between the walls and along the channel formed thereby. Thus, as the forward wheels 60 hit the inclined trucks 61 at the upwardly inclined panel, the forward end of the skimmer tilts upwardly and the forward pad 85 slides upwardly without binding along the upper forward quadrant of the actuator ball 72. Conversely, when the skimmer plate 62 comes down from the inclined panel the ball slides along the abrasion plates 85 without binding. Accordingly, no undue additional stress is placed on the drive system when, during its operation, the carriage travels up the inclined panel 56 to push the sludge into the collection drum 58, the ball track 74 and carriage 59, being able to rotate with respect to the actuator ball 72 at least the amount of incline of the panel 56. As the ball 72 travels about the sprockets from one run of the chain to the opposite run of the chain, the ball slides transversely along the abrasion pads 85 and in the channel therebetween without binding.

In practice, the skimmer 55 of the sludge separation apparatus is reciprocated intermittantly as sufficient sludge froth accumulates on the surface of the water in the separation tank 19. However, the pump 31 will generally be operated continuously even through brief periods when the booth 10 is not being used for spray coating. This ensures both the aeration of the water in the tanks 18, 19 and the cleaning of the water between coating operations. When the spray booth 10 is unutilized for extended periods the pump 31 may be shut down.

Thus, it can be seen that a sludge separation apparatus has been provided that fully meets the objects set forth above. While the invention has been described with reference to a preferred embodiment, it is not intended to so limit the invention. On the contrary, it is intended to cover all alternatives, modifications and equivalents within the scope of the invention as defined by the appended claims. For example, the divider 42 has been described in terms of a baffle plate. However, any structure capable of dividing the separation tank into two regions while permitting only sludge-free water to pass into one of the regions, such as a screen or the like, could function equally well.

What is claimed is:

1. A sludge-separating apparatus for removing sludge from a liquid from an adjacent holding tank comprising, in combination,
    a separation tank for receiving and holding a supply of liquid and sludge, the tank having a plurality of upstanding walls;
    pump means for transporting sludge and liquid from the adjacent holding tank to the separation tank, the pump means having an inlet in the holding tank and an outlet disposed at the bottom of the separation tank so that as liquid and sludge are discharged from the outlet, sludge particles settling on the bottom of the separation tank are circulated upwardly to the surface of the liquid;
    baffle means disposed in the separation tank adjacent the outlet of the pump means for directing sludge entering the separation tank through the pump means outlet toward the surface of the liquid in the separation tank;
    means dividing the separation tank into two regions, the outlet of the pump means being in the first region, the dividing means allowing relatively sludge-free liquid to pass through into the second region;
    liquid return means associated with the second region of the separation tank for returning the relatively sludge-free liquid to the holding tank; and
    automatic skimmer means associated with the first region of the separation tank for skimming floating sludge from the surface of the liquid and discharging the sludge over one of the upstanding walls bounding the first region of the separation tank.

2. The combination of claim 1 wherein the dividing means comprises a plate extending between two walls of the separation tank, the plate extending downward from above the surface of the liquid held in the separation tank and spaced from the bottom of the separation tank so that liquid may flow from the first region of the separation tank to the second region through the space between the bottom of the plate and the tank.

3. The combination of claim 1 wherein the liquid return means includes a weir integral with one of the upstanding walls of the second region of the separation tank, a reservoir to receive relatively sludge-free liquid that flows over the weir; and a return pipe connecting the reservoir to the holding tank.

4. The combination of claim 3 wherein the weir is adjustable with respect to the upstanding wall of the separation tank so that the height of the edge of the weir is changeable with respect to the liquid in the tank so as to control the rate of flow of sludge-free liquid into the reservoir.

5. The combination of claim 4 wherein the holding tank includes means for circulating the surface liquid and sludge toward the inlet of the pump means.

6. The combination of claim 5 wherein the circulating means comprises at least one nozzle disposed at the surface of the liquid and pointing toward the inlet, said nozzle spraying liquid therethrough.

7. The combination of claim 1 wherein the inlet of the pump means is disposed at the surface of the liquid in the holding tank, is non-circular, and one edge of the inlet constitutes a weir over which sludge and liquid flow into the pump means.

8. The combination of claim 7 wherein the height of the weir edge is adjustable to control the rate of flow of sludge and liquid into the inlet.

9. The combination of claim 1 wherein the automatic skimmer means comprises a carriage having a pusher plate mounted thereto and a drive means to reciprocate the carriage and pusher plate across the tank in a skimming direction and thereafter in a return direction, the drive means further comprising an endless drive, actuator means secured to the endless drive, and channel means secured to the carriage with the channel perpendicular to the direction of skimmer travel, the actuator means being captured in said channel means.

10. The combination of claim 9 wherein the channel means includes liner pads, and the actuator means comprises a ball whose diameter is slightly less than the distance between the liner pads of the channel.

11. Skimming apparatus for removing floating solids from a tank comprising, in combination, a carriage;

a pusher plate mounted on said carriage and extending into the water when the carriage reciprocates across the tank in a skimming direction;

drive means for reciprocating the carriage across the tank in a skimming direction, and thereafter in a return direction, the drive means further comprising a pair of end sprockets and an endless chain trained about the sprockets, means for rotating at least one of the sprockets so as to move the chain thereabout, actuator means secured to the chain, channel means secured to the carriage with the channel perpedicular to the direction of the skimmer travel, the channel means capturing the actuator means.

* * * * *

United States Patent [19]

Pearson

[11] Patent Number: 4,610,786

[45] Date of Patent: Sep. 9, 1986

[54] FILTER CAGE WITH REMOVABLE FILTERS

[75] Inventor: James A. Pearson, Northumberland, Great Britain

[73] Assignee: Swinney Engineering Limited, Morpeth, England

[21] Appl. No.: 594,225

[22] Filed: Mar. 28, 1984

[30] Foreign Application Priority Data

Mar. 29, 1983 [GB] United Kingdom ................ 8308588

[51] Int. Cl.$^4$ ...................... B01D 25/02; B01D 25/08
[52] U.S. Cl. .................................... 210/236; 210/232; 210/323.2; 210/333.1; 210/412
[58] Field of Search ............ 210/232, 236, 238, 323.2, 210/333.01, 333.1, 345, 347, 411, 412

[56] References Cited

U.S. PATENT DOCUMENTS

| | | | |
|---|---|---|---|
| 2,562,699 | 7/1951 | Cooperson | 210/333.01 |
| 2,709,525 | 5/1955 | Beyer | 210/232 |
| 2,718,310 | 9/1955 | Trahan | 210/232 |
| 2,742,157 | 4/1956 | Brunton | 210/333.1 |
| 3,225,933 | 12/1965 | Berline | 210/333.01 |
| 3,477,577 | 11/1969 | Florkowski | 210/333.1 |
| 4,446,099 | 5/1984 | Schwind | 210/232 |

FOREIGN PATENT DOCUMENTS 1091933  11/1967  United Kingdom ................ 210/232
2067087   7/1981  United Kingdom ................ 210/232

Primary Examiner—Ernest G. Therkorn
Attorney, Agent, or Firm—Brown, Martin & Haller

[57] ABSTRACT

A filter has a plurality of cylindrical filter elements (5) supported exteriorly over holes (4) in a hollow filter cage (3). A backwash pipe (11) is disposed axially of the filter cage (3) and has ducts (12) which are arranged, on rotation of the backwash pipe, to register with the holes (4) in the filter cage (3) to allow backwashing of the filter elements. The filter cage (3) has retaining portions (7) in the form of a T-slot or spaced abutments. The filter elements (5) each have a circumferential flange (8) provided with at least one flat (9) so that, in a first angular orientation of a filter element (5) the filter element is held firmly by engagement of the flange (8) under the retaining portions (7) and, in a second angular orientation, it is free for removal.

12 Claims, 18 Drawing Figures